US012720656B2

(12) United States Patent
Secord et al.

(10) Patent No.: US 12,720,656 B2
(45) Date of Patent: Aug. 25, 2026

(54) SELECTING ENTERTAINMENT LIGHTING DEVICES BASED ON DYNAMICITY OF VIDEO CONTENT

(71) Applicant: SIGNIFY HOLDING B.V., Eindhoven (NL)

(72) Inventors: Kyle Secord, San Francisco, CA (US); Antonie Leonardus Johannes Kamp, San Francisco, CA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 31 days.

(21) Appl. No.: 18/862,230

(22) PCT Filed: May 1, 2023

(86) PCT No.: PCT/EP2023/061430
§ 371 (c)(1),
(2) Date: Nov. 1, 2024

(87) PCT Pub. No.: WO2023/213750
PCT Pub. Date: Nov. 9, 2023

(65) Prior Publication Data

US 2025/0301546 A1 Sep. 25, 2025

Related U.S. Application Data

(60) Provisional application No. 63/338,060, filed on May 4, 2022.

(30) Foreign Application Priority Data

May 13, 2022 (EP) .................................... 22173173

(51) Int. Cl.
*H05B 47/105* (2020.01)
*G06V 20/40* (2022.01)
(Continued)

(52) U.S. Cl.
CPC .......... *H05B 47/105* (2020.01); *G06V 20/46* (2022.01); *H05B 47/155* (2020.01);
(Continued)

(58) Field of Classification Search
None
See application file for complete search history.

(56) References Cited

U.S. PATENT DOCUMENTS 12,089,303 B2 * 9/2024 Borra .................... H05B 47/12
12,159,416 B2 * 12/2024 Aliakseyeu ............ G06T 7/215
(Continued)

FOREIGN PATENT DOCUMENTS

WO 2008078233 A1 7/2008
WO WO-2020089150 A1 * 5/2020 .......... H05B 47/155
(Continued)

*Primary Examiner* — Srinivas Sathiraju

(57) ABSTRACT

A system (1) is configured to obtain a level of dynamicity (72) of video content and select one or more lighting devices from a plurality of lighting devices (13-16) based on the level of dynamicity. A first, higher quantity (81) of lighting devices is selected when the level of dynamicity exceeds a threshold and a second, lower quantity (82) of lighting devices is selected when the level of dynamicity does not exceed the threshold. The system is further configured to determine light effects for the one or more lighting devices based on the video content and control the one or more lighting devices to render the light effects while a display device (23) displays the video content.

15 Claims, 5 Drawing Sheets

| dyn | #ent | #oth | 13 | 14 | 15 | 16 |
|---|---|---|---|---|---|---|
| 0.8 | 4 | 0 | ent | ent | ent | ent |
| 0.5 | 2 | 2 | ent | ent | off | static |
| 0.2 | 2 | 2 | ent | ent | static | static |

(51) Int. Cl.
*H05B 47/155* (2020.01)
*H05B 47/165* (2020.01)
*H05B 47/175* (2020.01)
*H05B 47/19* (2020.01)

(52) U.S. Cl.
CPC ........... *H05B 47/165* (2020.01); *H05B 47/19* (2020.01); *H05B 47/1965* (2024.01)

(56) References Cited

U.S. PATENT DOCUMENTS

| | | | | |
|---|---|---|---|---|
| 2009/0219305 | A1 | 9/2009 | Diederiks et al. | |
| 2014/0104245 | A1 | 4/2014 | Li et al. | |
| 2019/0069375 | A1 | 2/2019 | Baker et al. | |
| 2021/0410251 | A1* | 12/2021 | Rycroft | G06V 20/49 |
| 2022/0015203 | A1* | 1/2022 | Sekulovski | H05B 45/20 |
| 2022/0053618 | A1* | 2/2022 | Borra | H05B 47/12 |
| 2022/0319015 | A1* | 10/2022 | Aliakseyeu | G06V 20/46 |
| 2024/0090104 | A1* | 3/2024 | Squillace | H05B 47/155 |
| 2025/0301546 | A1* | 9/2025 | Secord | H05B 47/105 |
| 2025/0341293 | A1* | 11/2025 | Weijers | F21K 9/237 |

FOREIGN PATENT DOCUMENTS

| | | | | |
|---|---|---|---|---|
| WO | 2020249543 | A1 | 12/2020 | |
| WO | 2021032811 | A1 | 2/2021 | |
| WO | 2021233733 | A1 | 11/2021 | |
| WO | WO-2023213608 | A1 * | 11/2023 | F21K 9/237 |
| WO | WO-2023213750 | A1 * | 11/2023 | H05B 47/1965 |
| WO | WO-2025180865 | A1 * | 9/2025 | F21S 10/005 |

* cited by examiner

| dyn | #ent | #oth | 13 | 14 | 15 | 16 |
|---|---|---|---|---|---|---|
| 0.8 | 4 | 0 | ent | ent | ent | ent |
| 0.5 | 2 | 2 | ent | ent | off | static |
| 0.2 | 2 | 2 | ent | ent | static | static |

SELECTING ENTERTAINMENT LIGHTING DEVICES BASED ON DYNAMICITY OF VIDEO CONTENT

CROSS-REFERENCE TO PRIOR APPLICATIONS

This application is the U.S. National Phase application under 35 U.S.C. § 371 of International Application No. PCT/EP2023/061430, filed on May 1, 2023, which claims the benefit of U.S. Provisional Patent Application No. 63/338,060, filed on May 4, 2022 and European Patent Application Ser. No. 22/173,173.0, filed on May 13, 2022. These applications are hereby incorporated by reference herein.

FIELD OF THE INVENTION

The invention relates to a system for controlling one or more lighting devices to render light effects while a display device displays video content.

The invention further relates to a method of controlling one or more lighting devices to render light effects while a display device displays video content.

The invention also relates to a computer program product enabling a computer system to perform such a method.

BACKGROUND OF THE INVENTION

Synchronized lighting systems exist that dynamically create light effects based on the video content displayed on a TV in a home entertainment setup. This is also referred to as entertainment light syncing. An example of such a synchronized lighting system is Hue Sync. WO 2021/032811 A1 also describes such a synchronized lighting system. Sometimes, e.g. in the case of Hue Sync, the lighting system defines a group of lights each with x,y,z location coordinates which receive and render these entertainment light effects. A controller analyzes the video content and subsequently generates the light effects that get sent to the applicable lighting devices. The controller's light effect algorithm is aware of each light's location within the room.

Sometimes, e.g. in the case of Hue Sync, a user specifies which lighting devices should be used to render the entertainment light effects, e.g. defines an entertainment area. When entertainment light syncing, all lights in the entertainment area are controlled to render the entertainment light effects. However, this produces a reduced experience when light syncing with certain content.

SUMMARY OF THE INVENTION

It is a first object of the invention to provide a system, which is able to create an entertainment light experience optimized for the type of video content being displayed on the display device.

It is a second object of the invention to provide a method, which can be used to create an entertainment light experience optimized for the type of video content being displayed on the display device.

In a first aspect of the invention, a system for controlling one or more lighting devices to render light effects while a display device displays video content comprises at least one output interface and at least one processor configured to obtain a level of dynamicity of said video content, select one or more lighting devices from a plurality of lighting devices based on said level of dynamicity, a first quantity of lighting devices being selected when said level of dynamicity exceeds a threshold and a second quantity of lighting devices being selected when said level of dynamicity does not exceed said threshold, said first quantity being higher than said second quantity, determine light effects for said one or more lighting devices based on said video content, and control, via said at least one output interface, said one or more lighting devices to render said light effects.

By using a larger number of lighting devices for dynamic content than for static content, the created light experience is optimized for the type of video content being displayed on the display device. As a result, less lighting devices are used for rendering entertainment light effects to accompany a talk show than for rendering entertainment light effects to accompany an action movie.

Using the maximum number of lighting devices for rendering entertainment light effects to accompany a talk show, as would normally be done, provides a reduced light experience, as light syncing with content that is generally static produces light syncing effects that are generally static, i.e. essentially no effect is created. It detracts from the light experience when the whole entertainment area is rendering the static colors of the talk show. On the other hand, when the user watches an action movie, all lighting devices should preferably render entertainment light effects to create the most immersive experience. The threshold may be predefined or dynamically determined.

Said at least one processor may be configured to select said one or more lighting devices from said plurality of lighting devices further based on distances between said display device and individual lighting devices of said plurality of lighting devices. For example, if the video content is generally dynamic, light syncing may be performed with all lights in entertainment area in order to focus on the entertainment light effects and if the video content is generally static, light syncing may be performed only with lights directly adjacent to the display device, e.g. while transitioning all other lights to a static ambiance color to create an ambiance. Lights directly adjacent to the display device often contribute the most to the entertainment light experience.

Said at least one processor may be configured to select one or more other lighting devices from said plurality of lighting devices, said one or more other lighting devices being different from said one or more lighting devices, and control, via said at least one output interface, each of said one or more other lighting devices to render another light effect which is static and/or not related to the video content or to render no light effect. If this other light effect is static, it may or may not be related to the video content. If this other light effect is dynamic, it must not be related to the video content.

Although all other lighting devices may be controlled to render no light effect, a better light experience may be achieved by creating an ambience. For example, talk shows are generally static and it detracts from experience when the whole entertainment area is rendering the static colors of the talk show. Instead, it may be better to limit light syncing to lights directly adjacent to the television while transitioning the other lights used for navigation (overhead, back of room) to a static ambiance color for a more relaxed and comfortable experience.

Said at least one processor may be configured to select a first subset and a second subset of said one or more other lighting devices based on distances between said display device and individual lighting devices of said one or more other lighting devices, said first subset being closer to said display device than said second subset, control said first subset of said one or more other lighting devices to render no light effect, and control said second subset of said one or more other lighting devices to render said other light effect. In this way a buffer between the spatial area where the entertainment light effects are rendered and the spatial area whether the other light effects are rendered may be created when the dynamicity level is neither very high nor very low. This results in a more pleasing light experience.

Said at least one processor may be configured to control at least one of said one or more other lighting devices to render a gradual transition from a current light setting of said at least one lighting device to said other light effect. This prevents sudden, distracting changes in light settings, e.g. when starting light syncing and/or when recalculating the dynamicity level for new video content.

Said at least one processor may be configured to determine said gradual transition based on said level of dynamicity before controlling said at least one lighting device to render said gradual transition. When the video content, and therefore the entertainment light effects rendered on the one or more lighting devices, is more dynamic, faster changes in light settings of another lighting device will typically be less distracting and may in that case be acceptable.

Said at least one processor may be configured to determine a static brightness level, said static brightness level being higher than a brightness level of said light effects rendered by said one or more lighting devices, and control at least one of said one or more other lighting devices to render said other light effect with said static brightness level. If another lighting device renders a static light effect, the created light ambiance is often most pleasing to the user if the brightness level of this static light effect is higher than the brightness level of the entertainment light effects. The static light effect may be a white light effect with a 50% dim level, for example.

Said at least one processor may be configured to obtain a user-specified definition of an entertainment area, identify said plurality of lighting devices based on said user-specified definition of said entertainment area, and select said one or more lighting devices from said identified plurality of lighting devices. In certain lighting systems, e.g. Hue Sync, the user first defines which lighting devices should be included in the entertainment area. For example, a lighting device in the bathroom is normally not included in the entertainment area. Conventionally, all lighting devices in the entertainment area would be controlled to render entertainment light effects. However, with the above-described system, when the level of dynamicity does not exceed the threshold, a (strict) subset of the lighting devices included in the entertainment area may be selected for rendering the entertainment light effects.

Said at least one processor may be configured to obtain, via at least one input interface of said system, information indicative of said level of dynamicity of said video content from a further system. This is beneficial, for example, if the video content is streamed and cannot (completely) be analyzed by the system beforehand.

Said at least one processor may be configured to analyze said video content and determine said level of dynamicity based on said analysis. This reduces reliance on content providers or other service providers making information indicative of the level of dynamicity available. For example, said at least one processor may be configured to analyze said video content to determine a quantity of pixels which change more than a predefined amount from a videoframe to a succeeding videoframe and/or video compression motion vectors and determine said level of dynamicity based on said quantity of pixels and/or said motion vectors.

Said at least one processor may be configured to obtain information indicative of a mood of said video content, determine said threshold based on said mood, and select said one or more lighting devices from said plurality of lighting devices based on said level of dynamicity and said threshold. The mood may be "scary", "tense", "fun", or "sad", for example. For certain moods of video content, the light experience is less affected by the number of lighting devices rendering the entertainment light effects than for other moods of video content. The threshold may be lower for fun movies/programs than for sad movies/programs, for example. The mood may be indicated in information obtained from a further system, e.g. in the same information which indicates the level of dynamicity of the video content, as described above.

Said at least one processor may be configured to determine a brightness level of said light effects for said one or more lighting devices based on a user-configured brightness level, and control said one or more lighting devices to render said light effects with said brightness level. Although the brightness level of the entertainment light effects could be determined (entirely) based on the video content, users often want to specify a preferred brightness value or range of brightness values.

In a second aspect of the invention, a method of controlling one or more lighting devices to render light effects while a display device displays video content comprises obtaining a level of dynamicity of said video content, selecting one or more lighting devices from a plurality of lighting devices based on said level of dynamicity, a first quantity of lighting devices being selected when said level of dynamicity exceeds a threshold and a second quantity of lighting devices being selected when said level of dynamicity does not exceed said threshold, said first quantity being higher than said second quantity, determining light effects for said one or more lighting devices based on said video content, and controlling said one or more lighting devices to render said light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling one or more lighting devices to render light effects while a display device displays video content.

The executable operations comprise obtaining a level of dynamicity of said video content, selecting one or more lighting devices from a plurality of lighting devices based on said level of dynamicity, a first quantity of lighting devices being selected when said level of dynamicity exceeds a threshold and a second quantity of lighting devices being selected when said level of dynamicity does not exceed said threshold, said first quantity being higher than said second quantity, determining light effects for said one or more lighting devices based on said video content, and controlling said one or more lighting devices to render said light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
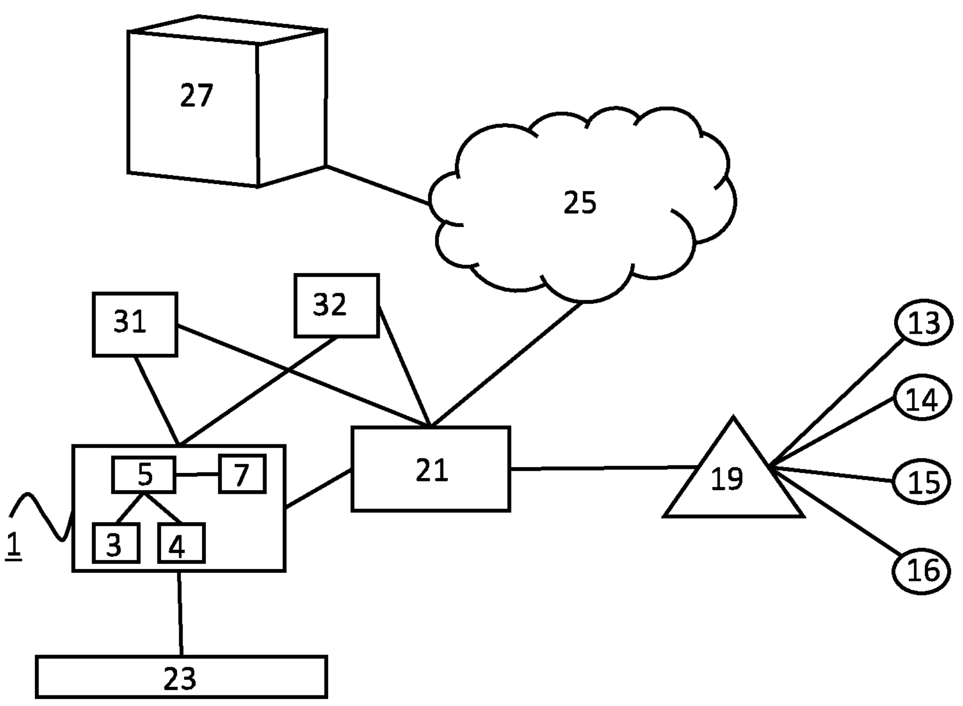
FIG. 1 is a block diagram of a first embodiment of the system.

FIG. 1 shows a first embodiment of the system for controlling one or more lighting devices to render light effects while a display device 23 displays video content. In the first embodiment, the system is an HDMI module 1. The light effects relate to the video content. The HDMI module 1 may be a Hue Play HDMI Sync Box, for example.

In the example of FIG. 1, The HDMI module 1 can control lighting devices 13-16 via a bridge 19. The lighting devices 13-16 may comprise pixelated and/or single pixel lighting devices. The bridge 19 may be a Hue bridge, for example. The bridge 19 communicates with the lighting devices 13-16, e.g., using Zigbee technology. The HDMI module 1 is connected to a wireless LAN access point 21, e.g., via Wi-Fi. The bridge 19 is also connected to the wireless LAN access point 21, e.g., via Wi-Fi or Ethernet.

Alternatively or additionally, the HDMI module 1 may be able to communicate directly with the bridge 19, e.g. using Zigbee technology, and/or may be able to communicate with the bridge 19 via the Internet/cloud. Alternatively or additionally, the HDMI module 1 may be able to control the lighting devices 13-16 without a bridge, e.g. directly via Wi-Fi, Bluetooth or Zigbee or via the Internet/cloud.

The wireless LAN access point 21 is connected to the Internet 25. A media server 27 is also connected to the Internet 25. Media server 27 may be a server of a video-on-demand service such as Netflix, Amazon Prime Video, HBO Max, Hulu, Disney+ or Apple TV+, for example. The HDMI module 1 is connected to a display device 23 and local media receivers 31 and 32 via HDMI. The local media receivers 31 and 32 may comprise one or more streaming or content generation devices, e.g., an Apple TV, Chromecast, Amazon Fire TV stick, Microsoft Xbox and/or Sony PlayStation, and/or one or more cable or satellite TV receivers.

In an alternative embodiment, the system for controlling one or more lighting devices to render light effects while a display device displays video content is the display device itself. In this alternative embodiment, HDMI module logic may be built-in in the display device. Media receivers 31 and 32 may then also be comprised in the display device, e.g., a smart TV.

The HDMI module 1 comprises a receiver 3, a transmitter 4, a processor 5, and memory 7. The processor 5 is configured to obtain a level of dynamicity of the video content and select one or more lighting devices from the lighting devices 13-16 based on the level of dynamicity. The level of dynamicity may be a value between 0 and 1, for example. A first, higher quantity of lighting devices is selected when the level of dynamicity exceeds a threshold and a second, lower quantity of lighting devices is selected when the level of dynamicity does not exceed the threshold. The processor 5 may be configured to analyze the video content and determine the level of dynamicity based on this analysis or may be configured to obtain information indicative of the level of dynamicity from a further system, e.g. from media server 27.

The processor 5 is further configured to determine light effects for the selected one or more lighting devices based on the video content and control, via the transmitter 4, the one or more selected lighting devices to render the light effects. The processor 5 may be configured to determine the light effects by analyzing the video content or from a light script which specifies light effects for this particular video content. Typically, at least the color of the light effects is extracted from the video content, e.g. by the processor 5.

In the embodiment of the HDMI module 1 shown in FIG. 1, the HDMI module 1 comprises one processor 5. In an alternative embodiment, the HDMI module 1 comprises multiple processors. The processor 5 of the HDMI module 1 may be a general-purpose processor, e.g. ARM-based, or an application-specific processor. The processor 5 of the HDMI module 1 may run a Unix-based operating system for example. The memory 7 may comprise one or more memory units. The memory 7 may comprise solid-state memory, for example.

The receiver 3 and the transmitter 4 may use one or more wired or wireless communication technologies such as Zigbee to communicate with the bridge 19 and HDMI to communicate with the display device 23 and with local media receivers 31 and 32, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The HDMI module 1 may comprise other components typical for a network device such as a power connector. The invention may be implemented using a computer program running on one or more processors.

In the embodiment of FIG. 1, the system of the invention is an HDMI module. In an alternative embodiment, the system may be another device, e.g., a mobile device, laptop, personal computer, a bridge, a media rendering device, a streaming device, or an Internet server. In the embodiment of FIG. 1, the system of the invention comprises a single device. In an alternative embodiment, the system comprises multiple devices.

Figure 2:
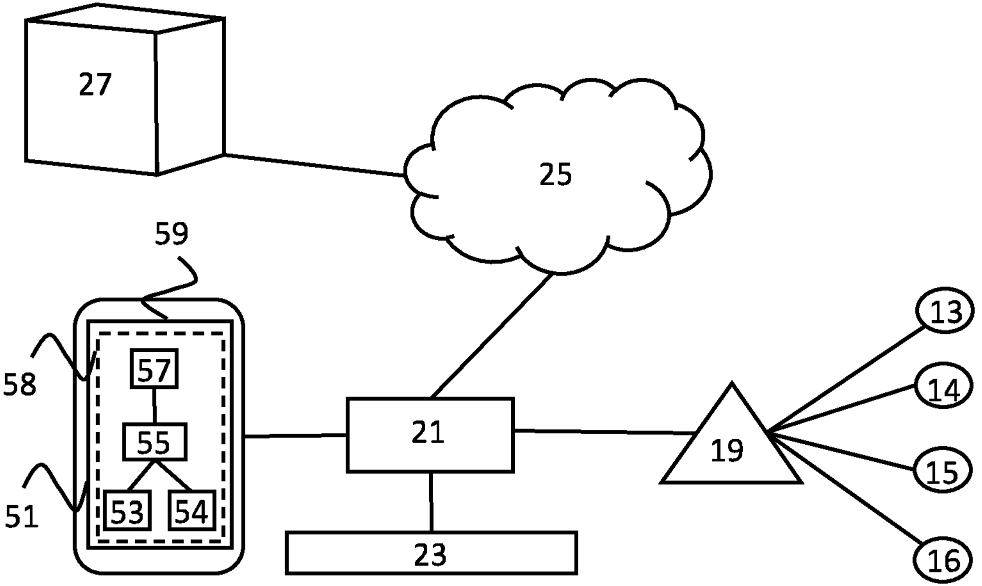
FIG. 2 is a block diagram of a second embodiment of the system.

FIG. 2 shows a second embodiment of the system for controlling one or more lighting devices to render light effects while a display device 23 displays video content. In the second embodiment, the system is a mobile device 51. The mobile device 51 may be a smart phone or a tablet, for example. The lighting devices 13-16 can be controlled by the mobile device 51 via the bridge 19. The mobile device 51 is connected to the wireless LAN access point 21, e.g., via Wi-Fi.

The mobile device 51 comprises a receiver 53 a transmitter 54, a processor 55, a memory 57, and a display 59. The video content is preferably displayed on the display device 23 but could also be displayed on display 59 of the mobile device 51. The processor 55 is configured to obtain a level of dynamicity of the video content and select one or more lighting devices from the lighting devices 13-16 based on the level of dynamicity.

A first, higher quantity of lighting devices is selected when the level of dynamicity exceeds a threshold and a second, lower quantity of lighting devices is selected when the level of dynamicity does not exceed the threshold. The processor 55 may be configured to analyze the video content and determine the level of dynamicity based on this analysis or may be configured to obtain information indicative of the level of dynamicity from a further system, e.g. from media server 27.

The processor 55 is further configured to determine light effects for the selected one or more lighting devices based on the video content and control, via the transmitter 54, the one or more selected lighting devices to render the light effects. The processor 55 may be configured to determine the light effects by analyzing the video content or from a light script which specifies light effects for this particular video content. Typically, at least the color of the light effects is extracted from the video content, e.g. by the processor 55.

In the embodiment of the mobile device 51 shown in FIG. 2, the mobile device 51 comprises one processor 55. In an alternative embodiment, the mobile device 51 comprises multiple processors. The processor 55 of the mobile device 51 may be a general-purpose processor, e.g. from ARM or Qualcomm or an application-specific processor. The processor 55 of the mobile device 51 may run an Android or iOS operating system for example. The display 59 may be a touchscreen display, for example. The display 59 may comprise an LCD or OLED display panel, for example. The memory 57 may comprise one or more memory units. The memory 57 may comprise solid state memory, for example.

The receiver 53 and the transmitter 54 may use one or more wireless communication technologies such as Wi-Fi (IEEE 802.11) to communicate with the wireless LAN access point 21, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may further comprise a camera (not shown). This camera may comprise a CMOS or CCD sensor, for example. The mobile device 51 may comprise other components typical for a mobile device such as a battery and a power connector. The invention may be implemented using a computer program running on one or more processors.

In the embodiment of FIG. 2, the lighting devices 13-16 are controlled via the bridge 19. In an alternative embodiment, one or more of the lighting devices 13-16 are controlled without a bridge, e.g., directly via Bluetooth. If the lighting devices 13-16 are controlled without a bridge, use of wireless LAN access point 21 may not be necessary. Mobile device may be connected to the Internet 25 via a mobile communication network, e.g., 5G, instead of via the wireless LAN access point 21.

Figure 3:
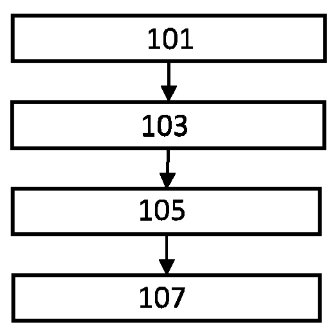
FIG. 3 is a flow diagram of a first embodiment of the method.

A first embodiment of the method of controlling one or more lighting devices to render light effects while a display device displays video content is shown in FIG. 3. The method may be performed by the HDMI module 1 of FIG. 1 or the mobile device 51 of FIG. 2, for example.

A step 101 comprises obtaining a level of dynamicity of the video content. A step 103 comprises selecting one or more lighting devices from a plurality of lighting devices based on the level of dynamicity obtained in step 101. A first quantity of lighting devices is selected when the level of dynamicity exceeds a threshold and a second quantity of lighting devices is selected when the level of dynamicity does not exceed the threshold. The first quantity is higher than the second quantity. Optionally, the one or more lighting devices may be selected from the plurality of lighting devices further based on distances between the display device and individual lighting devices of the plurality of lighting devices in step 103.

A step 105 comprises determining light effects for the one or more lighting devices selected in step 103 based on the video content. A step 107 comprises controlling the one or more lighting devices selected in step 103 to render the light effects determined in step 105.

Figure 4:
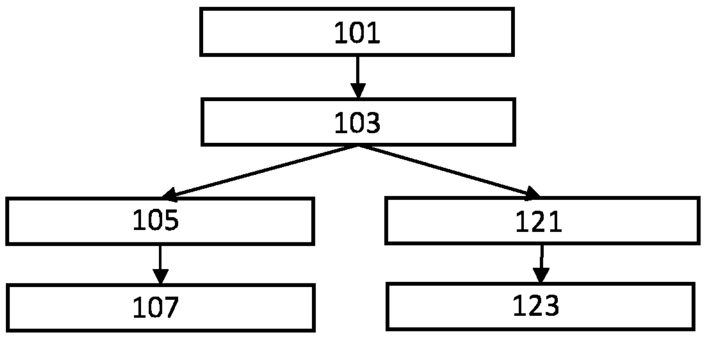
FIG. 4 is a flow diagram of a second embodiment of the method.

A second embodiment of the method of controlling one or more lighting devices to render light effects while a display device displays video content is shown in FIG. 4. The second embodiment of FIG. 4 is an extension of the first embodiment of FIG. 3.

Steps 121 and 123 are performed after step 103. In the embodiment of FIG. 4, steps are 121 and 123 are performed in parallel with steps 105 and 107. In an alternative embodiment, these steps may be performed sequentially, e.g.: 121,105,107,123.

Step 121 comprises selecting one or more other lighting devices from the plurality of lighting devices. The one or more other lighting devices selected in step 121 are different from the one or more lighting devices selected in step 103. All of the lighting devices not selected from the plurality of lighting devices in step 103 may be selected in step 121 or only some of these lighting devices may be selected in step 121. In an alternative embodiment, steps 103 and 121 are combined into a single step.

Step 123 comprises controlling each of the one or more other lighting devices selected in step 121 to render another light effect which is static and/or not related to the video content or to render no light effect. In an alternative embodiment, steps 107 and 123 are combined into a single step.

Figure 5:
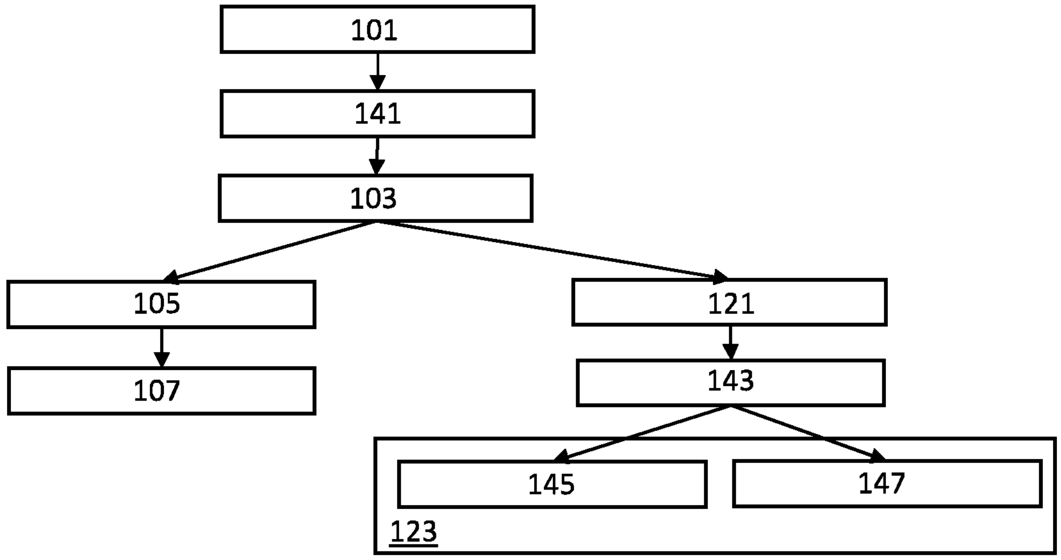
FIG. 5 is a flow diagram of a third embodiment of the method.

A third embodiment of the method of controlling one or more lighting devices to render light effects while a display device displays video content is shown in FIG. 5. The third embodiment of FIG. 5 is an extension of the second embodiment of FIG. 4. In the embodiment of FIG. 5, a step 141 is performed between steps 101 and 103, step 143 is performed after step 121, and step 123 is implemented by steps 145 and 147.

Step 141 comprises determining distances between the display device and individual lighting devices of the plurality of lighting devices. Step 103 comprises selecting one or more lighting devices from a plurality of lighting devices based on the level of dynamicity obtained in step 101. Optionally, in step 103, the one or more lighting devices are selected from the plurality of lighting devices not only based on the level of dynamicity but further based on the distances determined in step 141.

Step 121 is performed after step 103, as described in relation to FIG. 4. After the one or more other lighting devices have been selected in step 121, step 143 is performed. Step 143 comprises selecting a first subset and/or a second subset of the one or more other lighting devices selected in step 121. For certain levels of dynamicity, both a first subset and a second subset are selected. In this case, the first subset and the second subset are selected based on distances between the display device and individual lighting devices of the one or more other lighting devices, as determined in step 141. In this case, the first and second subsets are selected such that the first subset is closer to the display device than the second subset, e.g. that each lighting device of the first subset is closer to the display device than any lighting device of the second subset.

Step 145 is performed after step 143 if a first subset was selected in step 143. Step 145 comprises controlling the first subset of the one or more other lighting devices, as selected in step 143, to render no light effect. For example, commands may be transmitted to one or more lighting devices of the first subset to make them turn their light source(s) off. Such a command may be transmitted to a lighting device irrespective of whether it is currently rendering light or not or may be transmitted to a lighting device only if it has been established that this lighting device is currently rendering light.

Step 147 is performed after step 143 if a second subset was selected in step 143. Step 147 comprises controlling the second subset of the one or more other lighting devices, as selected in step 143, to render another light effect which is static and/or not related to the video content. If both a first subset and a second subset were selected in step 143, then both steps 145 and 147 are performed.

Figure 6:
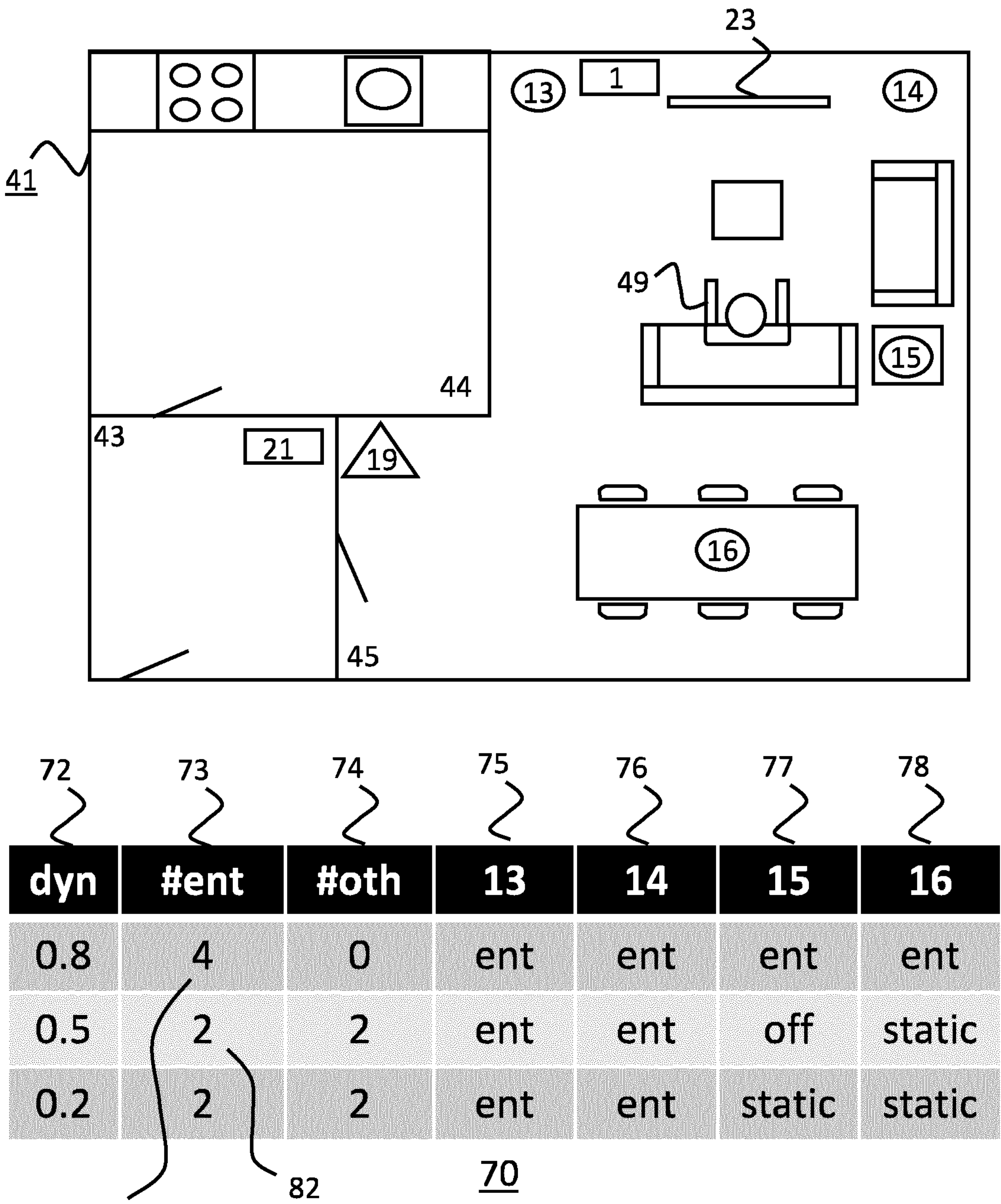
FIG. 6 shows examples of lighting devices being selected based on dynamicity level in a house with the lighting devices of FIG. 1.

FIG. 6 shows examples of lighting devices selected with the method of FIG. 5. A first floor 41 of a house is represented in FIG. 6. The first floor 41 has a hallway 43, a kitchen 44, and a living room 45. The lighting devices of FIG. 1 have been installed in the living room 45. The HDMI module 1, the bridge 19, and the display device 23 of FIG. 1 have also been installed in the living room 45. The wireless LAN access point 21 of FIG. 1 has been installed in the hallway 21. The lighting devices 13 and 14 are located on respectively the left and right side of the display device 23. The lighting device 15 is located right next to the couch on which a user 49 is sitting. The lighting device 16 is located above the dining table.

Table 70 shows how many lighting devices are selected to render entertainment light effects (i.e. dynamic light effects related to the video content) based on different levels of dynamicity. Table 70 further shows which of the lighting devices that have not been selected to render entertainment light effects show a static light effect. This static light effect may be related or unrelated to the video content. Alternatively, one or more of these other lighting devices may be controlled to render a dynamic light effect which is not related to the video content (not shown in FIG. 6).

Column 72 of table 70 lists the different levels of dynamicity. Column 73 lists how many of the lighting devices 13-16 have been selected to render entertainment light effects based on the corresponding level of dynamicity in column 72. Column 74 lists how many of the lighting devices 13-16 have not been selected to render entertainment light effects. Columns 75-78 indicate whether the respective lighting devices 13-16 are selected to render entertainment light effects, a static light effect, or no light effect at all. Cell 81 indicates that four lighting devices are selected to render entertainment light effects when the dynamicity level is 0.8 and cell 82 indicates that two lighting devices are selected to render entertainment light effects when the dynamicity level is 0.5. The threshold is in this case located between 0.5 and 0.8. The threshold may be pre-defined or dynamically determined.

In the example of FIG. 6, the lighting devices 13-16 are selected in step 103 of FIG. 5 if the level of dynamicity is 0.8. In this example, no other lighting devices are selected in step 121 of FIG. 5 and steps 143, 145, and 147 are skipped. Lighting devices 13 and 14 are selected in step 103 of FIG. 5 if the level of dynamicity is 0.5 or 0.2. In these two examples, lighting devices 15 and 16 are selected as other lighting devices in step 121. In these two examples, lighting devices 13 and 14 are selected to render entertainment light effects because they are closest to the display device 23. Alternatively or additionally, other parameters may be taken into account in this selection.

When the dynamicity level is 0.5, lighting device 15 is assigned to the first subset and lighting device 16 is assigned to the second subset in step 143 of FIG. 5, because lighting device 15 is closer to the display device 23 than lighting device 16. When the dynamicity level is 0.2, lighting devices 15 and 16 are both assigned to the second subset in step 143 and no lighting devices are assigned to the first subset. Lighting device 15 is assigned to the first subset when the dynamicity level is neither very high nor very low in order to create a buffer between the spatial area where the entertainment light effects are rendered and the spatial area whether the other light effects are rendered. This creates a more pleasing light experience.

Figure 7:
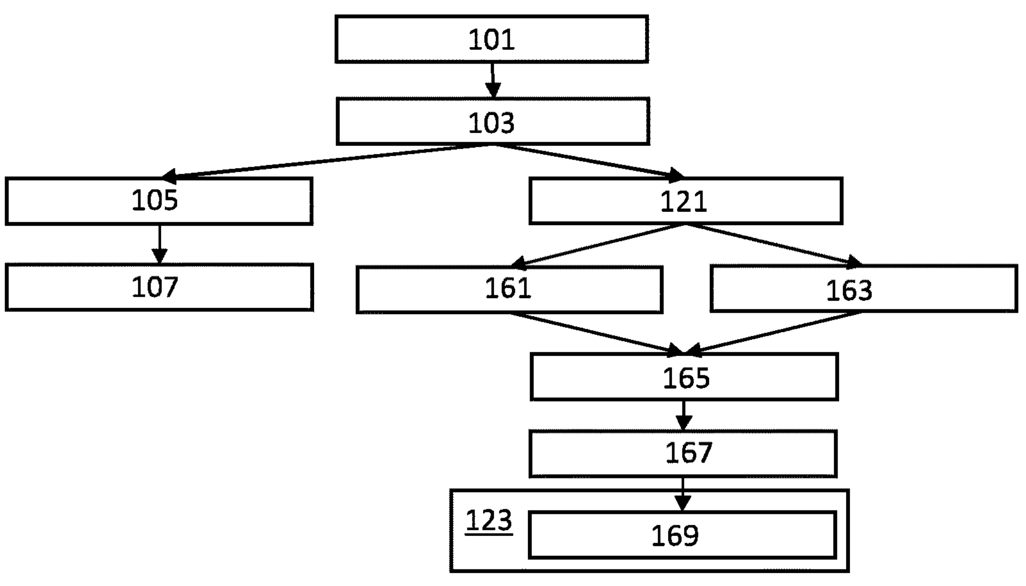
FIG. 7 is a flow diagram of a fourth embodiment of the method.

A fourth embodiment of the method of controlling one or more lighting devices to render light effects while a display device displays video content is shown in FIG. 7. The fourth embodiment of FIG. 7 is an extension of the second embodiment of FIG. 4. In the embodiment of FIG. 7, step 123 is implemented by a step 169 and steps 161, 163, 165, and 167 are performed between steps 121 and 123. Step 161 comprises determining a current light setting of at least one of the one or more other lighting devices selected in step 121. Step 163 comprises determining a static brightness level which is higher than a brightness level of the light effects rendered by the one or more lighting devices, as determined in step 105.

Step 165 is performed after steps 161 and 163 have been performed. Step 165 comprises determining, based on the level of dynamicity obtained in step 101, a gradual transition from the current light setting determined in step 161, to another light effect, normally an ambiance light effect. This other light effect has the static brightness level determined in step 163. Step 167 is performed after step 165. Step 167 comprises controlling the at least one lighting device to render the gradual transition determined in step 165. Step 169 is performed after step 167. Step 169 comprises controlling the one or more other lighting devices selected in step 121 to render the other light effect, which has the static brightness level.

Figure 8:
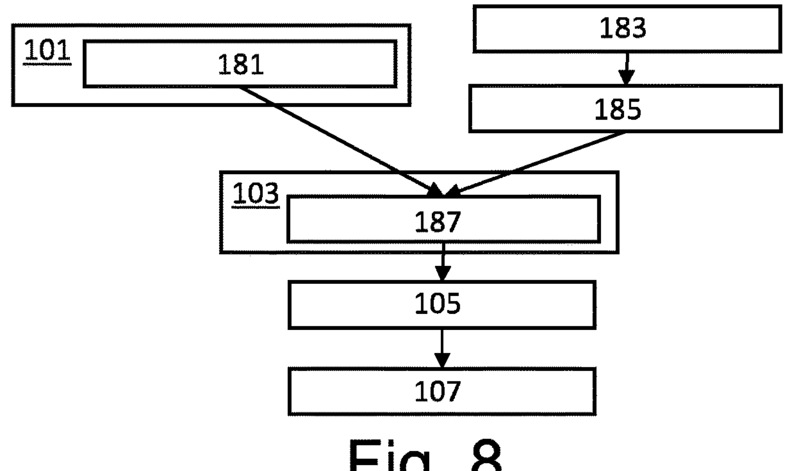
FIG. 8 is a flow diagram of a fifth embodiment of the method.

A fifth embodiment of the method of controlling one or more lighting devices to render light effects while a display device displays video content is shown in FIG. 8. The fifth embodiment of FIG. 8 is an extension of the first embodiment of FIG. 3. In the embodiment of FIG. 8, step 101 is implemented by a step 181, step 103 is implemented by a step 187, and steps 183 and 185 are performed before step 103.

Step 181 comprises obtaining information indicative of the level of dynamicity of the video content from a further system. Step 183 comprises obtaining a user-specified definition of an entertainment area. Step 185 comprises identifying a plurality of lighting devices based on the user-specified definition of the entertainment area obtained in step 183. Step 187 comprises selecting the one or more lighting devices, which are to be controlled to render the entertainment light effects, from the plurality of lighting devices identified in step 185, based on the level of dynamicity obtained in step 181.

Figure 9:
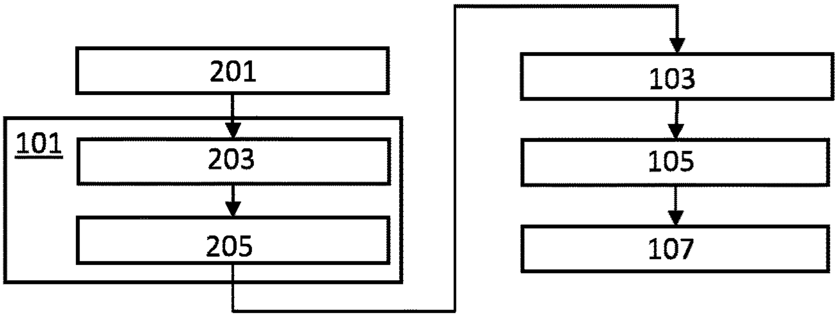
FIG. 9 is a flow diagram of a sixth embodiment of the method.

A sixth embodiment of the method of controlling one or more lighting devices to render light effects while a display device displays video content is shown in FIG. 9. The sixth embodiment of FIG. 9 is an extension of the first embodiment of FIG. 3. In the embodiment of FIG. 9, step 101 is implemented by steps 203 and 205 and a step 201 is performed before step 101.

Step 201 comprises obtaining video content. Step 203 comprises analyzing the video content obtained in step 201. Step 205 comprises determining a level of dynamicity based on the analysis of step 203. Step 103 comprises selecting one or more lighting devices from a plurality of lighting devices based on the level of dynamicity determined in step 205.

For example, step 203 may comprise analyzing the video content to determine a quantity of pixels which change more than a predefined amount from a videoframe to a succeeding videoframe and step 205 may comprise determining the level of dynamicity based on the quantity of pixels. The predefined amount may be zero pixels, but is preferably larger than zero pixels, e.g. one pixel. Although it is possible to determine the level of dynamicity from a spatial region within the videoframe (i.e. smaller than the videoframe), it is preferable to determine the level of dynamicity from the whole videoframe. The level of dynamicity may first be determined per sample, e.g. a spatial region of less than 100×100 pixels, and then averaged.

Instead of or in addition to determining the level of dynamicity based on quantities of pixels which have changed, the level of dynamicity may be determined based on video compression motion vectors. It may be possible to analyze a piece of video content, e.g. a TV program or movie, in its entirety before the one or more lighting devices are controlled to render the entertainment light effects in step 107. In this case, the level of dynamicity only needs to be determined once for the piece of video content and the results would normally be good.

If the light effects are determined in real-time, it is typically not possible to analyze a piece of video content in its entirety before the one or more lighting devices are controlled to render the entertainment light effects in step 107. In this case, the level of dynamicity may be determined multiple times, e.g. if it is not possible to obtain information indicative of the level of dynamicity from a further system. The level of dynamicity may be determined every X seconds, for example. X may have a value between 15 seconds and 300 seconds, for example.

To prevent frequent changes in the number of lighting devices which are used to render the light effects, the analyzed part of the video content is preferably longer than the X seconds. For instance, the level of dynamicity may be the weighted average of a level dynamicity determined for the most recent part of the video content having a duration of X seconds and previous levels of dynamicity.

Figure 10:
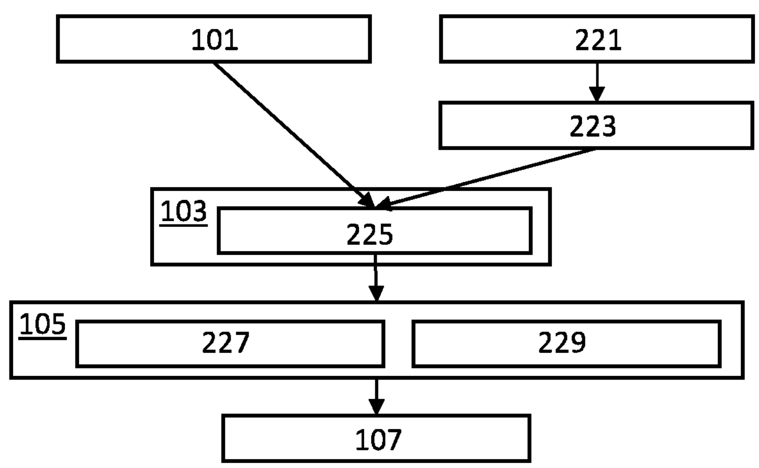
FIG. 10 is a flow diagram of a seventh embodiment of the method.

A seventh embodiment of the method of controlling one or more lighting devices to render light effects while a display device displays video content is shown in FIG. 10. The seventh embodiment of FIG. 10 is an extension of the first embodiment of FIG. 3. In the embodiment of FIG. 10, step 103 is implemented by a step 225 and steps 221 and 223 are performed before step 225. Furthermore, in the embodiment of FIG. 10, step 105 comprises sub steps 227 and 229.

Step 221 comprises obtaining information indicative of a mood of the video content. The mood may be "scary", "tense", "fun", or "sad", for example. Step 223 comprises determining the threshold based on the mood, e.g. from a mapping from mood value to threshold value. For example, the threshold may be lower for fun movies/programs than for sad movies/programs. Step 225 comprises selecting one or more lighting devices from the plurality of lighting devices based on the level of dynamicity and the threshold. The embodiment of FIG. 10 is thus an example of an embodiment in which the threshold is not predefined but dynamically determined.

Step 227 comprises determining colors of the light effects for the one or more lighting devices, e.g. based on an analysis of the video content. Step 229 comprises determining a brightness level of the light effects for the one or more lighting devices based on a user-configured brightness level. Step 107 comprises controlling the one or more lighting devices to render the light effects with the colors determined in step 227 and the brightness level determined in step 229.

The embodiments of FIGS. 3 to 5 and 7 to 10 differ from each other in multiple aspects, i.e., multiple steps have been added or replaced. In variations on these embodiments, only a subset of these steps is added or replaced and/or one or more steps is omitted. As a first example, steps 161, 165, and 167 may be omitted from the embodiment of FIG. 7 and/or added individually to the embodiment of FIG. 4 and/or the embodiment of FIG. 5. As a second example, steps 221, 223, and 225 may be omitted from the embodiment of FIG. 10 and/or added (e.g. without step 229) to any of the other embodiments.

Multiple of the embodiments may be combined. As a first example, the embodiments of FIG. 5 and FIG. 7 may be combined. As a second example, the embodiment of FIG. 10 may be combined with any of the embodiments of FIGS. 3 to 5 and 7 to 9. As a third example, the embodiment of FIG. 8 or the embodiment of FIG. 9 may be combined with any of the embodiments of FIGS. 3, 4, 5, and 7.

Figure 11:
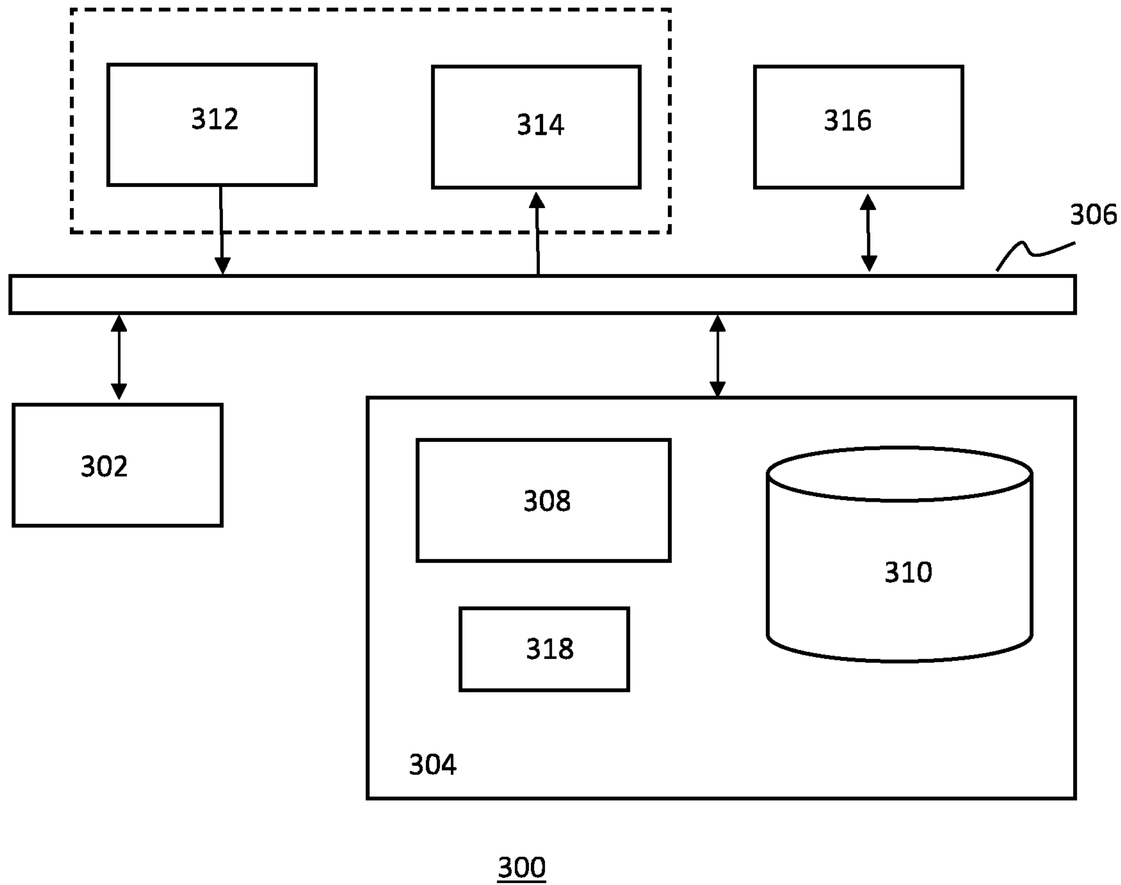
FIG. 11 is a block diagram of an exemplary data processing system for performing the method of the invention.

FIG. 11 depicts a block diagram illustrating an exemplary data processing system that may perform the method as described with reference to FIGS. 3 to 5 and 7 to 10.

As shown in FIG. 11, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g., for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 11, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 11) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling one or more lighting devices from a plurality of lighting devices to render light effects while a display device displays video content, said system comprising:
- at least one output interface; and
- at least one processor configured to:
  - obtain a level of dynamicity of said video content,
  - select said one or more lighting devices from said plurality of lighting devices based on said level of dynamicity, a first quantity of said one or more lighting devices being selected when said level of dynamicity exceeds a threshold and a second quantity of said one or more lighting devices being selected when said level of dynamicity does not exceed said threshold, said first quantity being higher than said second quantity,
  - determine light effects for said one or more lighting devices based on said video content, and
  - control, via said at least one output interface, said one or more lighting devices to render said light effects.

2. The system as claimed in claim 1, wherein said at least one processor is configured to select said one or more lighting devices from said plurality of lighting devices further based on distances between said display device and individual lighting devices of said plurality of lighting devices.

3. The system as claimed in claim 1, wherein said at least one processor is configured to:
- select one or more alternative lighting devices from said plurality of lighting devices, said one or more alternative lighting devices being different from said one or more lighting devices, and
- control, via said at least one output interface, each of said one or more alternative lighting devices (i) to render an alternative light effect that is at least one of static or not related to the video content or (ii) to render no light effect.

4. The system as claimed in claim 3, wherein said at least one processor is configured to:
- select a first subset and a second subset of said one or more alternative lighting devices based on distances between said display device and individual lighting devices of said one or more alternative lighting devices, said first subset being closer to said display device than said second subset, control said first subset of said one or more alternative lighting devices to render no light effect, and control said second subset of said one or more alternative lighting devices to render said alternative light effect.

5. The system as claimed in claim 3, wherein said at least one processor is configured to control at least one of said one or more alternative lighting devices to render a gradual transition from a current light setting of said at least one lighting device to said alternative light effect.

6. The system as claimed in claim 5, wherein said at least one processor is configured to determine said gradual transition based on said level of dynamicity before controlling said at least one lighting device of said one or more alternative lighting devices to render said gradual transition.

7. The system as claimed in claim 3, wherein said at least one processor is configured to:

determine a static brightness level, said static brightness level being higher than a brightness level of said light effects rendered by said one or more lighting devices, and control at least one of said one or more alternative lighting devices to render said alternative light effect with said static brightness level.

8. The system as claimed in claim 1, wherein said at least one processor is configured to obtain a user-specified definition of an entertainment area, identify said plurality of lighting devices based on said user-specified definition of said entertainment area, and select said one or more lighting devices from said identified plurality of lighting devices.

9. The system as claimed in claim 1, wherein said at least one processor is configured to obtain, via at least one input interface of said system, information indicative of said level of dynamicity of said video content from a further system.

10. The system as claimed in claim 1, wherein said at least one processor is configured to analyze said video content and determine said level of dynamicity based on said analysis.

11. The system as claimed in claim 10, wherein said at least one processor is configured to analyze said video content (i) to determine a quantity of pixels that change more than a predefined amount from a videoframe to a succeeding videoframe and/or video compression motion vectors and (ii) to determine said level of dynamicity based on said quantity of pixels and/or said motion vectors.

12. The system as claimed in claim 1, wherein said at least one processor is configured to:

obtain information indicative of a mood of said video content, determine said threshold based on said mood, and select said one or more lighting devices from said plurality of lighting devices based on said level of dynamicity and said threshold.

13. The system as claimed in claim 1, wherein said at least one processor is configured to:

determine a brightness level of said light effects for said one or more lighting devices based on a user-configured brightness level, and control said one or more lighting devices to render said light effects with said brightness level.

14. A method of controlling one or more lighting devices from a plurality of lighting devices to render light effects while a display device displays video content, said method comprising:

obtaining a level of dynamicity of said video content;

selecting said one or more lighting devices from said plurality of lighting devices based on said level of dynamicity, a first quantity of said one or more lighting devices being selected when said level of dynamicity exceeds a threshold and a second quantity of said one or more lighting devices being selected when said level of dynamicity does not exceed said threshold, said first quantity being higher than said second quantity;

determining light effects for said one or more lighting devices based on said video content; and controlling said one or more lighting devices to render said light effects.

15. A non-transitory computer program code to perform the method of claim 14 when run on a processor.

* * * * *